(12) United States Patent
Meid et al.

(10) Patent No.: US 10,072,996 B2
(45) Date of Patent: Sep. 11, 2018

(54) METHOD FOR DETERMINING A MASS OF AN ATTACHED IMPLEMENT FOR A UTILITY VEHICLE

(71) Applicant: Deere & Company, Moline, IL (US)

(72) Inventors: Michael Meid, Waghaeusel (DE); Sebastian Traut, Kaiserslautern (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/463,073

(22) Filed: Mar. 20, 2017

(65) Prior Publication Data
US 2017/0315005 A1    Nov. 2, 2017

(30) Foreign Application Priority Data

Apr. 27, 2016   (DE) .................. 10 2016 207 204

(51) Int. Cl.
*A01B 63/10* (2006.01)
*E02F 3/30* (2006.01)
(Continued)

(52) U.S. Cl.
CPC .......... *G01L 5/0009* (2013.01); *A01B 59/069* (2013.01); *A01B 63/10* (2013.01);
(Continued)

(58) Field of Classification Search
CPC . E02F 9/264; E02F 3/431; E02F 3/422; E02F 3/283; E02F 3/432; E02F 3/30; A01B 63/10; A01B 59/068; B60P 1/5433
See application file for complete search history.

(56) References Cited

U.S. PATENT DOCUMENTS 3,027,029 A  *  3/1962  Clarke ................. B60P 1/5433
                                                     414/487
3,635,364 A  *  1/1972  Tingleff .................... E02F 3/30
                                                     37/443
(Continued)

FOREIGN PATENT DOCUMENTS

| EP | 0892256 A1 | 1/1999 |
| EP | 2239467 A2 | 10/2010 |
| EP | 2947431 A1 | 11/2015 |

OTHER PUBLICATIONS

European Search Report issued in counterpart application No. 17165908.9 dated Oct. 2, 2017. (7 pages).
German Search Report issued in counterpart application No. 102016207204.8 dated Dec. 16, 2016. (8 pages).

*Primary Examiner* — Yuri Kan

(57) ABSTRACT

A method for determining a mass of an implement attached to a vehicle includes providing a powerlift having at least one upper link and one lower link, a support structure, and the implement. The method also includes defining an angle ($\psi$) between the upper link and a vehicle horizontal line, an angle ($\varphi$) between the lower link and a vehicle horizontal line, an angle of inclination ($\theta$) of a vehicle horizontal line relative to a terrestrial horizontal line, a path (AK) that represents a connection along the lower link between the support structure and the implement, and a force ($F_E$) impinging on a connection between the upper link and the implement and acting along the upper link. The mass is determined as a function of at least one of the angle ($\psi$), the angle ($\varphi$), the angle of inclination ($\theta$), the path (AK), and the force ($F_E$).

20 Claims, 3 Drawing Sheets

(51) Int. Cl.
  *G01L 5/00* (2006.01)
  *A01B 63/108* (2006.01)
  *A01B 63/14* (2006.01)
  *A01B 59/06* (2006.01)
  *A01B 63/11* (2006.01)
(52) U.S. Cl.
  CPC ............ *A01B 63/108* (2013.01); *A01B 63/11* (2013.01); *A01B 63/145* (2013.01); *A01B 59/064* (2013.01)

(56) References Cited

U.S. PATENT DOCUMENTS

| | | | | |
|---|---|---|---|---|
| 4,627,013 | A * | 12/1986 | Ichiyama | E02F 9/264 177/141 |
| 4,825,568 | A * | 5/1989 | Kawamura | E02F 3/432 172/274 |
| 6,518,519 | B1 * | 2/2003 | Crane, III | E02F 9/264 177/136 |
| 6,699,000 | B2 * | 3/2004 | Moses | E02F 3/283 414/685 |
| 2004/0200624 | A1 * | 10/2004 | Ochi | A01B 59/068 172/4 |
| 2008/0110647 | A1 | 5/2008 | Guo et al. | |
| 2010/0161185 | A1 * | 6/2010 | Marathe | E02F 3/431 701/50 |
| 2015/0354177 | A1 * | 12/2015 | Shatters | E02F 3/422 414/21 |

* cited by examiner

METHOD FOR DETERMINING A MASS OF AN ATTACHED IMPLEMENT FOR A UTILITY VEHICLE

RELATED APPLICATIONS

This application claims the benefit of German Application Ser. No. 102016207204.8, filed on Apr. 27, 2016, the disclosure of which is hereby expressly incorporated by reference in its entirety.

FIELD OF THE DISCLOSURE

The present disclosure relates to a method for determining a mass of an attached implement that is articulated to a support structure of a utility vehicle.

BACKGROUND

Coupling attached implements with defined working functions to the front end of agricultural vehicles is known in the art. A front powerlift, for example, can be used for the coupling. It is often important to obtain information about the current status of a mass of the attached implement during vehicle operation in order to be able to control the agricultural activity better.

There is a need for a process of determining current status information regarding a mass of the attached implement.

SUMMARY

In one embodiment of the present disclosure, respective status information regarding a determined mass is particularly relevant for attached implements having variable load materials (e.g. agents to be sprayed, fertilizer, seed) such as sprayers, fertilizer spreaders and seeders.

The determined mass of the attached implement is a current total mass of the attached implement including the current loaded material, or a mass of the attached implement without a load material. Since the mass of the attached implement can be determined or is already known, the amount of the loaded material that has been consumed can be determined at any time during the deployment of the vehicle. From the determination of the attached implement mass, additional information can also be derived such as the dispensed mass or quantity of the loaded material per traveled distance unit (e.g. meter) of the vehicle, or a residual range of the loaded material to be dispensed. Such information can be derived with little data or calculation effort and can be made available to the vehicle driver or some other person responsible for the vehicle deployment in a suitable manner visually and/or acoustically (e.g., on a graphical user interface). Determining the mass and the information derived therefrom can therefore contribute to making the respective work deployment of the vehicle efficient and comfortable for the vehicle driver.

The mass of the attached implement is determined based on physical parameters at the front powerlift that can be determined relatively easily. At least one of the following parameters determined includes:

an angle between the upper link and a vehicle horizontal line,
an angle between the lower link and a vehicle horizontal line,
an angle of inclination of a vehicle horizontal line relative to the terrestrial horizontal line,
a path that represents a connection along the lower link between the support structure and the attached implement, or
a force impinging on a connection between the upper link and the attached implement and acting along the upper link.

The above-mentioned angles can be determined by means of suitable length sensors or distance sensors. Alternatively, angle sensors can be used. For a mechanical upper link or lower link, the angle between the upper link or lower link and a vehicle horizontal line can also be determined by means of a biaxial force sensor (force measuring pin). The above-mentioned path is known and need not be further determined. Alternatively, a length sensor or distance sensor can be used to determine the path. The force impinging on the connection between the upper link and the attached implement and acting along the upper link can be determined by means of pressure sensors in the upper link. For a mechanical upper link, this force can also be determined by means of a biaxial force sensor (force sensing pin). This biaxial force sensor is arranged at a connecting point that acts as the connection between the support structure and the upper link.

The additional angles, paths and forces yet to be described can also be determined or measured by one or more of the above-mentioned sensors.

Overall, the mass of the attached implement can be determined with a small number of sensors available as standard products and therefore cost-effectively, and with a low number of sensed physical parameters. Some of the required sensors may already be present on the vehicle for other purposes, so that the expense for determining the mass of the attached implement is further reduced in such cases.

The angles formed relative to the vehicle horizontal line or the vehicle vertical line relate to a fixed vehicle coordinate system. The inclination of the support structure or the utility vehicle or the fixed vehicle coordinate system relative to the terrestrial horizontal line is taken into account here by the above-mentioned angle of inclination. The angle of inclination takes on values greater than zero when the utility vehicle is oriented uphill in the forward direction.

In particular, the utility vehicle is an agricultural vehicle such as a tractor. The support structure is a support structure of the vehicle, e.g., a frame or other supporting parts. The upper link and the lower links of the powerlift are pivotably mounted on or articulated to the support structure in order to be able to transfer the respective attached implement into different positions.

The pivotable mounting or articulation on the support structure means that the respective component is either mounted or articulated directly on the support structure itself or on a component rigidly connected to the support structure (e.g. the casing of a transmission differential block).

The front powerlift typically effects a multipoint mounting of the attached implement on the vehicle. In particular, a three point hitch is provided with which the attached implement is hitched or articulated to the support structure by means of two lower links and one upper link.

The powerlift usually contains at least one adjustable-length lifting arm in order to be able to transfer the attached implement into different positions (e.g., working position, transport position) by means of the existing lower links and upper link. The lift arms present on the powerlift are actuated at least in part in a manner (e.g., hydraulically or electrically) suitable for implementing lifting and lowering movements of the powerlift.

An adjustable-length lifting arm is advantageously used to derive one or more physical parameters for determining the mass of the attached implement. This takes into account an angle that is enclosed by a vehicle vertical line and a connecting path between two operative ends of the lifting arm. This angle is determined by means of a suitable sensor system, e.g., an angle sensor.

A pressure force acting between the two operative ends of the lifting arm is further considered for determining the mass of the attached implement. This pressure force can be determined either directly by means of a sensor system on this lifting arm or indirectly by means of a sensor system at some other suitable point of the powerlift. The sensor system includes a pressure sensor, more particularly a differential pressure sensor.

One operative end of the adjustable-length lifting arm has an articulated connection to the support structure, while an additional operative end of the lifting arm is articulated to a link-connecting point of the lower link. An additional parameter for determining the mass of the attached implement can advantageously be considered in this way. This parameter is the length of a connecting path along the lower link between the support structure and the link-connecting point. The length of this connecting path is either already known from the data for the powerlift or is determined in a suitable manner.

Individual or all adjustable-length lifting arms used in the powerlift are each constructed as a piston-cylinder unit and act in particular as hydraulic lifting cylinders, which can be coupled to a hydraulic control circuit in a technically simple manner.

The determined mass of the attached implement is advantageously also used to determine data regarding the center of gravity of the attached implement. This can support a movement control of the powerlift, e.g., for a precise transfer of the attached implement into a desired target position.

A coordinate system having an x-axis and a z-axis is defined for unambiguous determination of the center of gravity. The x-axis is oriented parallel to a longitudinal direction or a vehicle horizontal line of the utility vehicle and the z-axis is oriented parallel to a vertical direction or a vehicle vertical line of the vehicle, the x-axis and the z-axis intersecting in a zero point of the coordinate system. Thereby the data for the center of gravity can be easily determined mathematically with an unambiguous reference point. Suitable zero points can be the position of a rear axle of the vehicle, for example.

In a further embodiment, the determined data for the center of gravity of the attached implement contains the x-coordinate thereof in the above-mentioned coordinate system, whereby sufficient data for a movement control of the front powerlift and for determination of the current position of the attachment can be determined in many application cases with a small algorithmic processing effort.

The x-coordinate of the center of gravity of the attached implement is determined as a function of at least one of the following physical parameters at the powerlift:
  an angle between the upper link and a horizontal line of the vehicle,
  a force impinging on a connection between the upper link and the attached implement and acting along the upper link,
  an x-coordinate of an articulation point of the lower link on the attached implement,
  a difference between the x-coordinates of an articulation point of the upper link on the attached implement and an articulation point of the lower link on the attached implement, and
  a difference between the z-coordinates of an articulation point of the upper link on the attached implement and an articulation point of the lower link on the attached implement.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
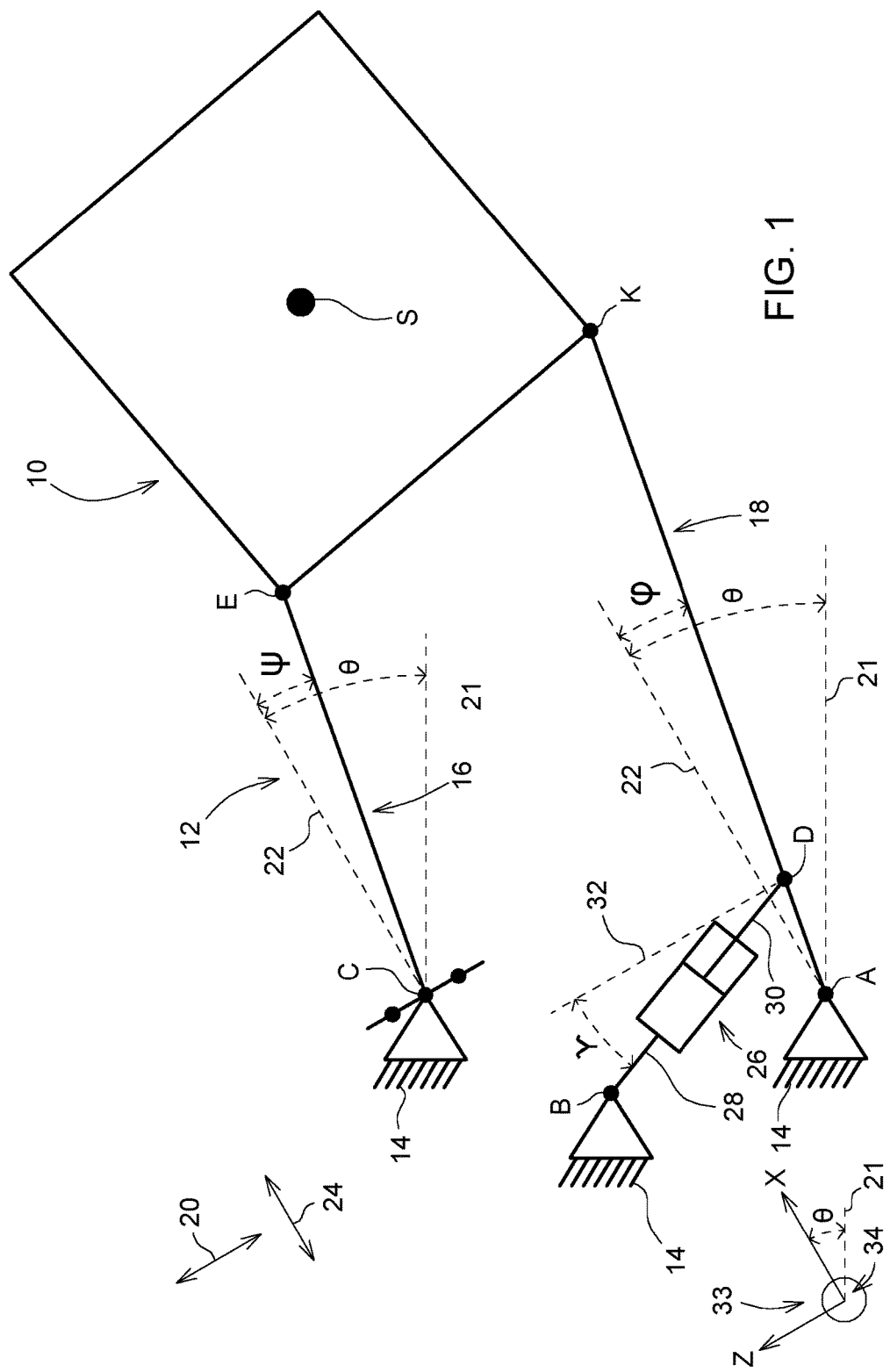
FIG. 1 is a schematic side view of an attached implement articulated to a front powerlift at the front end of a utility vehicle.

In FIG. 1, an attached implement 10 is schematically shown articulated to the front end of a utility vehicle (such as a tractor). A front powerlift 12 is articulated onto a support structure 14 of the utility vehicle. The front powerlift 12, having an upper link 16 and two parallel lower links 18, forms a three-point hitch for receiving the attached implement 10. The upper link 16 has an articulated connection via an articulation point C to the support structure 14 and via an articulation point E to the attached implement 10. In a transverse direction of the utility vehicle, running perpendicular to the plane of FIG. 1, the upper link 16 is arranged centrally between two parallel lower links 18. Each lower link 18 has an articulated connection via an articulation point A to the support structure 14 and via an articulation point K to the attached implement 10. The articulation points E, K on the attached implement are designed in the usual manner, e.g., as catch hooks for the front powerlift 12.

In the present embodiment, the articulation point C permits three different positions in the vertical direction 20 for articulating the upper link 16. The respective position is defined by a user and accordingly installed. An angle $\psi$ is enclosed between the upper link 16 and a vehicle horizontal line 22. An angle $\varphi$ is enclosed between each lower link 18 and a vehicle horizontal line 22.

The angles formed between the vehicle horizontal line 22 and a vehicle vertical line 32, particularly angles $\psi$ and $\varphi$, relate to a fixed vehicle coordinate system 33 having an x-axis and a z-axis. The x-axis runs parallel to the longitudinal direction 24 of the utility vehicle or parallel to the vehicle horizontal line 22. The z-axis runs parallel to the vertical direction 20 of the utility vehicle or parallel to the vehicle vertical line 32. The inclination of the support structure 14, and thus of the vehicle horizontal line 22 of the utility vehicle, relative to the terrestrial horizontal line 21, is represented by an angle of inclination $\theta$. The angle of inclination $\theta$ takes on values greater than zero when the utility vehicle is oriented uphill in the forward direction. The angle of inclination θ analogously assumes values less than zero when the utility vehicle is oriented downhill in the forward direction.

A lifting arm designed in a conventional manner as an adjustable-length lifting cylinder 26 (piston-cylinder unit) is a component of the front powerlift 12. One operative end 28 of the lifting cylinder 26 has an articulated connection to an articulation point B of the support structure 14, whereas the other operative end 30 of the lifting cylinder 26 is articulated to a link-connecting point D of the lower link 18. A connecting path between the two operative ends 28, 30 encloses an angle γ with the vehicle vertical line 32 running in the vertical direction 20. Both lower links 18 are connected to a lifting cylinder 26 in the manner described.

For mathematical/geometrical determination of a mass m and a center of gravity S of the attached implement 10, a coordinate system 33 is defined, the x-axis of which is oriented parallel to the longitudinal direction 24 and the z-axis of which is oriented parallel to the vertical direction 20. In the present embodiment of FIG. 1, the zero point of this coordinate system 33 lies on a schematically indicated rear axle 34 of the utility vehicle.

Figure 2:
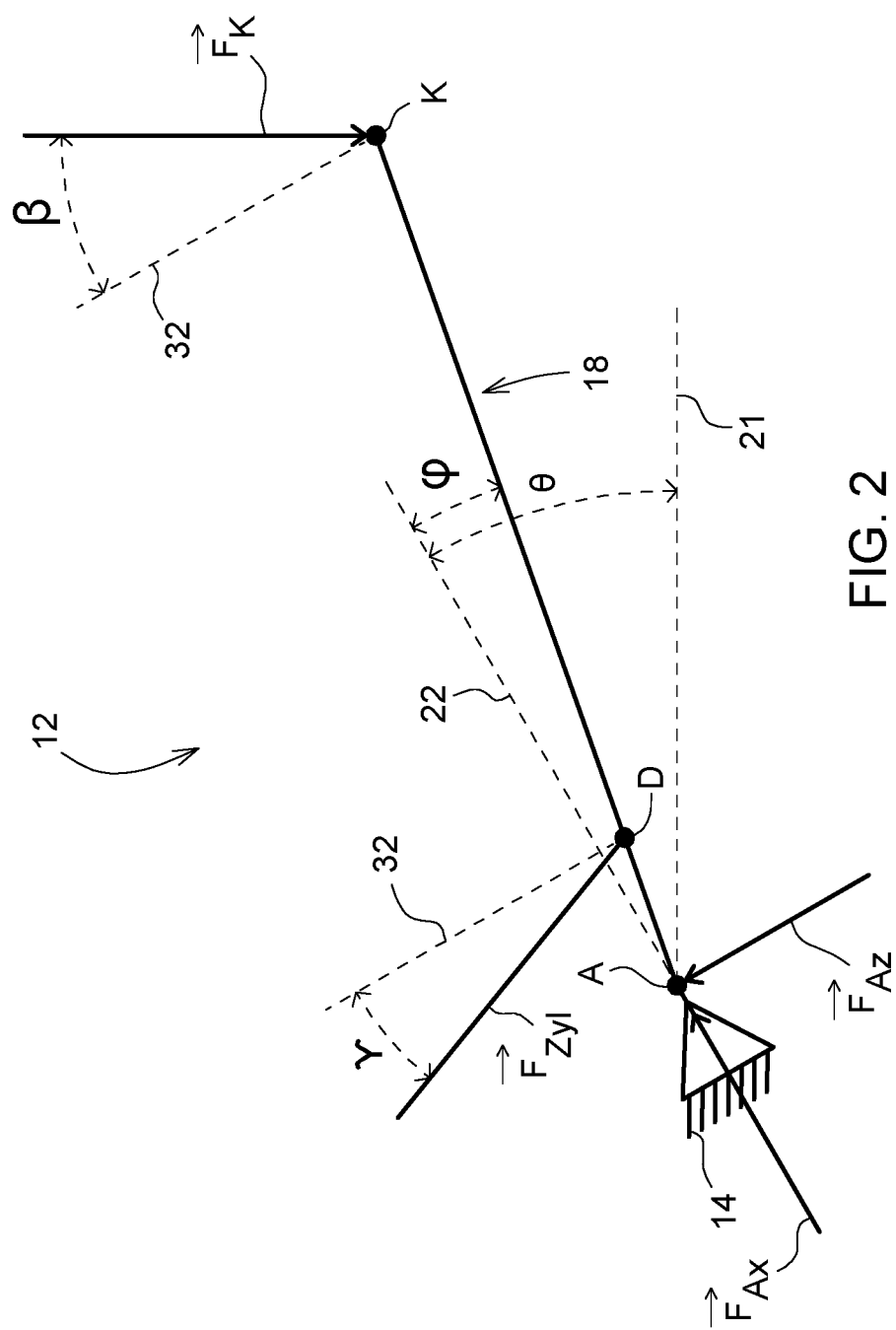
FIG. 2 is a schematic representation of forces impinging on a lower link of the front powerlift according to FIG. 1.

FIG. 2 presents different forces impinging on the force system between support structure 14 and attached implement 10. A force of which the x-component is designated $F_{Ax}$ and the z-component is designated $F_{Az}$ impinges on the articulation point A. A cylinder force $F_{Zyl}$ is active between the two operative ends 28, 30 of the lifting cylinder 26. A force designated $F_K$ impinges on the articulation point K between the attached implement 10 and the lower link 18, and is oriented at an angle β relative to the vehicle vertical line 32.

Figure 3:
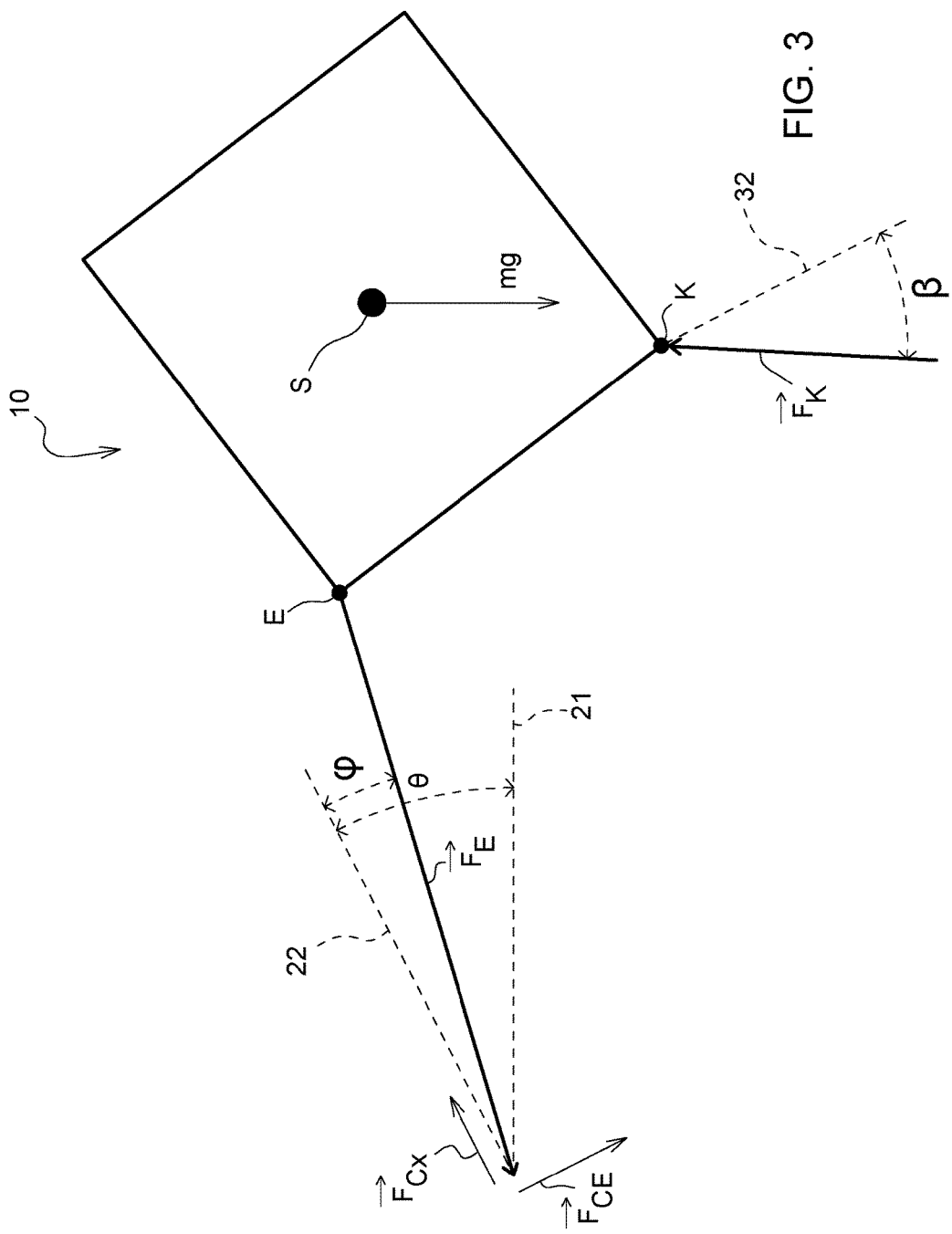
FIG. 3 is a schematic representation of forces impinging on the attached implement from FIG. 1.

Additional forces that impinge on the attached implement 10 are illustrated in FIG. 3. A force impinging on the articulation point E and acting along the upper link 16 is designated $F_E$. The weight force of the attached implement 10 at center of gravity S is marked m·g, where g is the gravitational constant.

Based on the torque and force equilibria in FIG. 2, the following relationships can be assumed at the front powerlift 12:

$$\sum M_i^{(A)} = 0 \to 0 = -\overline{AD} \cdot \vec{F}_{Zyl} \cdot \sin\gamma \cdot \sin\varphi + \overline{AD} \cdot \vec{F}_{Zyl} \cdot \cos\gamma \cdot \cos\varphi - \quad (1)$$
$$\overline{AK} \cdot \vec{F}_K \cdot \sin\varphi \cdot \sin\beta - \overline{AK} \cdot \vec{F}_K \cdot \cos\varphi \cdot \cos\beta,$$

$$\sum \vec{F}_{ix} = 0 \to 0 = \vec{F}_K \cdot \sin\beta - \vec{F}_{Zyl} \cdot \sin\gamma + \vec{F}_{Ax}, \quad (2)$$

$$\sum \vec{F}_{iz} = 0 \to 0 = \vec{F}_K \cdot \cos\beta - \vec{F}_{Zyl} \cdot \cos\gamma + \vec{F}_{Az}. \quad (3)$$

Due to the torque and force equilibria in FIG. 3, the following additional relationships at the front powerlift 12 can be assumed:

$$\sum M_i^{(K)} = 0 \to 0 = (E_x - K_x) \cdot \vec{F}_E \cdot \sin\psi + (E_z - K_z) \cdot \vec{F}_E \cdot \cos\psi - \quad (4)$$
$$(S_x - K_x) \cdot m \cdot g \cdot \cos\theta + (S_z - K_z) \cdot m \cdot g \cdot \sin\theta,$$

$$\sum \vec{F}_{ix} = 0 \to 0 = \vec{F}_K \cdot \sin\beta - \vec{F}_E \cdot \cos\psi - m \cdot g \cdot \sin\theta \to \vec{F}_K \cdot \sin\beta = \quad (5)$$
$$\vec{F}_E \cdot \cos\psi + m \cdot g \cdot \sin\theta,$$

$$\sum \vec{F}_{iz} = 0 \to 0 = \vec{F}_K \cdot \cos\beta + \vec{F}_E \cdot \sin\psi - m \cdot g \cdot \cos\theta \to \vec{F}_K \cdot \cos\beta = \quad (6)$$
$$-\vec{F}_E \cdot \sin\psi + m \cdot g \cdot \cos\theta.$$

By inserting equations (5) and (6) into equation (1), and by solving equation (1) for the mass m of the attached implement 10, it follows that for the mass m $$m = \frac{\overline{AD} \cdot \vec{F}_{Cyl} \cdot \cos(\varphi + \gamma) + \overline{AK} \cdot \vec{F}_E \cdot \sin(\psi - \varphi)}{\overline{AK} \cdot g \cdot \cos(\varphi - \theta)}. \quad (7)$$

Thus, the mass m is determined as a function of
- the angle ψ between the upper link 16 and the vehicle horizontal line 22,
- the angle φ between the lower link 18 and the vehicle horizontal line 22,
- the angle γ between the lifting cylinder 26 and the vehicle vertical line 32,
- the angle of inclination θ of the support structure 14 or the vehicle horizontal line 22 of the utility vehicle in relation to the terrestrial horizontal line 21,
- the path AK along the lower link 18 as the connection between the articulation points A and K,
- the path AD along the lower link 18 between the articulation point A and the link-connecting point D,
- the cylinder force $F_{Zyl}$ on the lifting cylinder 26, and
- the force $F_E$ along the upper link 16.

The lengths of paths AD and AK are known design parameters of the front powerlift 12. The force $F_{Zyl}$ can be measured by means of a pressure sensor or differential pressure sensor in the lifting cylinder 26. The force $F_E$ can be measured by means of pressure sensors and a length sensor on the upper link 16, for example, or alternatively (in the case of a mechanical sensor 16) by means of a two-axial force sensor at the articulation point C. The angles φ, γ and ψ in equation (7) can be derived as follows:

$$\varphi = \tan^{-1}\left(\frac{A_z - D_z}{A_x - D_x}\right)$$

$$\gamma = \tan^{-1}\left(\frac{D_x - B_x}{D_z - B_z}\right)$$

$$\psi = \tan^{-1}\left(\frac{E_z - C_z}{E_x - C_x}\right) = \tan^{-1}\left(\frac{\vec{F}_{Cz}}{\vec{F}_{Cx}}\right)$$

The x-coordinates $A_x$, $B_x$ and the z-coordinates $A_z$, $B_z$ are known since the articulation points A and B thereof on the support structure 14 have fixed coordinates relative to the coordinate system 33. The x-coordinate $C_x$ and the z-coordinate $C_z$ of the articulation point C are also known, and are therefore either determined by sensors or specified by the operator.

The above-mentioned angles can also be measured by means of suitable angle sensors. Alternatively, biaxial force measuring pins can be used, as illustrated with reference to angle ω and the two force components $F_{Cx}$ (along the x-axis of the coordinate system 33) and $F_{Cz}$ (along the z-axis of the coordinate system 33) in schematic form (see FIG. 3).

The variable x-coordinates and z-coordinates $D_x$ and $D_z$ of the link-connecting point D and $E_x$ and $E_z$ of the articulation point E can be derived mathematically, as described below.

To calculate the connecting point D, two circles are defined. The first circle has a radius corresponding to the path BD with a circle center B and the second circle has a radius corresponding to the path AD with a circle center A. The associated circle equations are $$(D_x - A_x)^2 + (D_z - A_z)^2 = \overline{AD}^2 \quad (D_x - B_x)^2 + (D_z - B_z)^2 = \overline{BD}^2$$

The two circle equations are solved for the z component of the coordinate D. This yields a straight-line equation of a straight line running through the two circle centers, of the form $$D_z = -\underbrace{\left(\frac{B_x - A_x}{B_z - A_z}\right)}_{u} \cdot D_x + \underbrace{\left(\frac{\overline{AD}^2 - \overline{BD}^2 + B_x^2 + B_z^2 - A_x^2 - A_z^2}{2 \cdot (B_z - A_z)}\right)}_{s}$$

$$D_z = -u \cdot D_x + s$$

With respect to the link-connecting point D, the quadratic equation that follows by inserting the straight-line equation into one of the two circle equations.

$$D_x^2 + \underbrace{\frac{2 \cdot (-B_x - u \cdot w)}{1 + u^2}}_{p_2} \cdot D_x + \underbrace{\frac{B_x^2 + w^2 - \overline{BD}^2}{1 + u^2}}_{q_2} = 0$$

as well as the auxiliary variables u, s and w $$u = \left(\frac{B_x - A_x}{B_z - A_z}\right)$$

$$s = \left(\frac{\overline{AD}^2 - \overline{BD}^2 + B_x^2 + B_z^2 - A_x^2 - A_z^2}{2 \cdot (B_z - A_z)}\right)$$

$$w = s - B_z$$

are defined. This yields the following equations for the x-coordinate $D_x$ and the z-coordinate $D_z$:

$$D_x = -\frac{p_2}{2} + \sqrt{\frac{p_2^2}{4} - q_2} = \qquad (8)$$

$$\frac{(B_x + u \cdot w)}{1 + u^2} + \sqrt{\left(\frac{(B_x + u \cdot w)}{1 + u^2}\right)^2 - \frac{B_x^2 + w^2 - \overline{BD}^2}{1 + u^2}}$$

$$D_z = -u \cdot D_x + s. \qquad (9)$$

The path BD can be measured by means of a length sensor or a distance sensor, for example.

Two additional circles are defined for calculating the articulation point E. The first circle has a radius corresponding to the path EK with a circle center K and the second circle has a radius corresponding to the path CE with a circle center C. The associated circle equations are $$(E_x - C_x)^2 + (E_z - C_z)^2 = \overline{CE}^2 \quad (E_x - K_x)^2 + (E_z - K_z)^2 = \overline{EK}^2$$

The two circle equations are solved for the z component of the articulation point E. This yields a straight-line equation of a straight line running through the two circle centers, of the form $$E_z = -\underbrace{\left(\frac{C_x - K_x}{C_z - K_z}\right)}_{n} \cdot E_x + \underbrace{\left(\frac{\overline{EK}^2 - \overline{CE}^2 + C_x^2 + C_z^2 - K_x^2 - K_z^2}{2 \cdot (C_z - K_z)}\right)}_{b}$$

$$E_z = -n \cdot E_x + b$$

With respect to the articulation point E, the quadratic equation that follows by inserting the straight-line equation into one of the two circle equations $$E_x^2 + \underbrace{\frac{2 \cdot (-C_x - n \cdot z)}{1 + n^2}}_{p} \cdot E_x + \underbrace{\frac{C_x^2 + z^2 - \overline{CE}^2}{1 + n^2}}_{q} = 0$$

and the auxiliary variables n, b and z $$n = \left(\frac{C_x - K_x}{C_z - K_z}\right)$$

$$b = \left(\frac{\overline{EK}^2 - \overline{CE}^2 + C_x^2 + C_z^2 - K_x^2 - K_z^2}{2 \cdot (C_z - K_z)}\right)$$

$$z = b - C_z$$

are defined. This yields the following equations for the x-coordinate $E_x$ and the z-coordinate $E_z$:

$$E_x = -\frac{p}{2} + \sqrt{\frac{p^2}{4} - q} = \qquad (10)$$

$$\frac{(C_x + n \cdot z)}{1 + n^2} + \sqrt{\left(\frac{(C_x + n \cdot z)}{1 + n^2}\right)^2 - \frac{C_x^2 + z^2 - \overline{CE}^2}{1 + n^2}}$$

$$E_z = -n \cdot E_x + b \qquad (11)$$

The path CE can also be measured by means of a length sensor or a distance sensor on the upper link 16, for example, or this path CE is known for a constant length of the upper link 16. The path EK is a defined value corresponding to the dimensioning of the attached implement 10.

The x-coordinate $S_x$ of the center of gravity S relative to the coordinate system 33 can be determined by solving equation (4) for $S_x$. In this case, the angle of inclination θ is assumed to be 0°:

$$S_x = \frac{1}{m \cdot g} \left[ (E_x - K_x) \cdot \vec{F}_E \cdot \sin \psi + (E_z - K_z) \cdot \vec{F}_E \cdot \cos \psi + K_x \cdot m \cdot g \right] \qquad (12)$$

Thus, the x-coordinate of the center of gravity S is determined as a function of
- the determined mass m,
- the angle ψ between the upper link 16 and the vehicle horizontal line 22,
- the force $F_E$ on the upper link 16,
- the x-coordinate $K_x$ of the articulation point K of the lower link 18 at the attached implement 10,
- the difference between the x-coordinates $E_x$ and $K_x$ of the articulation points E and K at the attached implement 10, and
- the difference between the z-coordinates $E_z$ and $K_z$ of the articulation points E and K at the attached implement 10.

The x-coordinate $K_x$ and the z-coordinate $K_z$ of the articulation point K follow from, for example $$K_x = A_x + AK \cdot \cos \varphi \text{ and } K_z = A_z - AK \cdot \sin \varphi,$$

where the path AK is a known design parameter. The other components and values of equation (12) can be derived according to the above description.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of deploying a utility vehicle for work using a mass of an implement attached at a front of the utility vehicle for moving the implement into different positions at the front of the utility vehicle, the method comprising:
   providing a front powerlift having at least one upper link and at least one lower link, a support structure formed at the front of the utility vehicle, and the implement being articulatably coupled to the support structure, wherein each of the at least one upper link and the at least one lower link is pivotably mounted to each of the support structure and the implement;
   defining an angle ($\psi$) between the at least one upper link and a vehicle horizontal line, an angle ($\varphi$) between the at least one lower link and the vehicle horizontal line, an angle of inclination ($\theta$) of the vehicle horizontal line relative to a terrestrial horizontal line, a path (AK) that represents a connection along the at least one lower link between the support structure and the implement, and a force ($F_E$) impinging on a connection between the at least one upper link and the implement and acting along the at least one upper link; and
   determining the mass of the implement as a function of at least one of the angle ($\psi$), the angle ($\varphi$), the angle of inclination ($\theta$), the path (AK), and the force ($F_E$).

2. The method of claim 1, further comprising:
   providing the front powerlift with an adjustable-length lifting arm; and
   determining the mass of the implement as a function of an angle ($\gamma$) that is enclosed by a vehicle-vertical line and a connecting path (BD) between two operative ends of the lifting arm.

3. The method of claim 2, further comprising determining the mass of the implement as a function of a force ($F_{Zyl}$) acting between the two operative ends of the lifting arm.

4. The method of claim 2, wherein one operative end of the lifting arm comprises an articulated connection to the support structure, and another operative end of the lifting arm comprises an articulated connection to a link-connecting point of the at least one lower link.

5. The method of claim 4, further comprising determining the mass of the implement as a function of a path (AD) defined by a connection along the at least one lower link between the support structure and the link-connecting point.

6. The method of claim 2, further comprising providing a lifting arm including a piston-cylinder unit.

7. The method of claim 1, further comprising determining a center of gravity of the implement as a function of the determined mass of the implement.

8. The method of claim 1, further comprising:
   defining a coordinate system having an x-axis oriented parallel to a longitudinal direction of the utility vehicle and a z-axis oriented parallel to a vertical direction of the utility vehicle, wherein the x-axis and the z-axis intersect at a zero point of the coordinate system; and
   determining at least one of the mass or a center of gravity of the implement based on the coordinate system.

9. The method of claim 8, further comprising arranging the zero point on a rear axle of the utility vehicle.

10. The method of claim 8, further comprising determining an x-coordinate of the center of gravity of the implement as a function of the mass of the implement.

11. The method of claim 10, wherein the determining the x-coordinate of the center of gravity step is determined as a function of at least one of the angle ($\psi$) between the at least one upper link and a vehicle horizontal line, the force ($F_E$) impinging on the connection between the at least one upper link and the implement and acting along the at least one upper link, an x-coordinate of an articulation point of the at least one lower link on the implement, a difference between the x-coordinates of an articulation point of the at least one upper link on the implement and an articulation point of the at least one lower link on the implement, and a difference between the z-coordinates of an articulation point of the at least one upper link on the implement and an articulation point of the at least one lower link on the implement.

12. The method of claim 1, wherein determining the mass of the implement includes determining the mass of the implement as a function of the angle ($\psi$), the angle ($\varphi$), the angle of inclination ($\theta$), the path (AK), and the force ($F_E$).

13. A front powerlift system for work deployment of a utility vehicle having a vehicle horizontal line defining an angle of inclination ($\theta$) relative to a terrestrial horizontal line, the system comprising:
   at least one upper link defining an angle ($\psi$) between the at least one upper link and the vehicle horizontal line of the utility vehicle;
   at least one lower link defining an angle ($\varphi$) between the at least one lower link and the vehicle horizontal line of the utility vehicle;
   a support structure formed at the front of the utility vehicle and having the at least one upper link and the at least one lower link pivotably mounted thereto; and
   an implement articulatably coupled to the support structure, the at least one upper link and the at least one lower link pivotably mounted thereto, and a mass of the implement being configured as a function of at least one of the angle ($\psi$), the angle ($\varphi$), the angle of inclination ($\theta$), a path (AK) representing a connection along the at least one lower link between the support structure and the implement, and a force (FE) impinging on a connection between the at least one upper link and the implement and acting along the at least one upper link.

14. The system of claim 13, wherein the mass of the implement is configured as a function of the angle ($\psi$), the angle ($\gamma$), the angle of inclination ($\theta$), a path (AK) representing a connection along the at least one lower link between the support structure and the implement, and a force ($F_E$) impinging on a connection between the at least one upper link and the implement and acting along the at least one upper link.

15. The system of claim 13, further comprising an adjustable-length lifting arm having two operative ends including a first operative end of the lifting arm comprising an articulated connection to the support structure and a second operative end of the lifting arm comprising an articulated connection to a link-connecting point of the at least one lower link, the mass of the implement being further configured as a function of at least one of a force ($F_{Zyl}$) acting between the two operative ends of the lifting arm, a path (AD) defined by a connection along the at least one lower link between the support structure and the link-connecting point, and an angle (γ) that is enclosed by a vehicle-vertical line and a connecting path (BD) between the two operative ends of the lifting arm.

16. The system of claim 13, wherein a center of gravity of the implement is configured as a function of the mass of the implement.

17. The system of claim 13, further comprising a coordinate system having:
  an x-axis oriented parallel to a longitudinal direction of the utility vehicle; and
  a z-axis oriented parallel to a vertical direction of the utility vehicle, wherein the x-axis and the z-axis intersect at a zero point of the coordinate system, and the coordinate system forming a basis of at least one of the mass and a center of gravity of the implement.

18. The system of claim 17, wherein the zero point is arranged on a rear axle of the utility vehicle.

19. The system of claim 17, further comprising an x-coordinate of the center of gravity of the implement configured as a function of at least one of an angle between the at least one upper link and the vehicle horizontal line, a force ($F_E$) impinging on the connection between the at least one upper link and the implement and acting along the at least one upper link, an x-coordinate of an articulation point of the at least one lower link on the implement, a difference between the x-coordinates of an articulation point of the at least one upper link on the implement and an articulation point of the at least one lower link on the implement, and a difference between the z-coordinates of an articulation point of the at least one upper link on the implement and an articulation point of the at least one lower link on the implement.

20. A front powerlift system for work deployment of a utility vehicle having a vehicle horizontal line defining an angle of inclination (θ) relative to a terrestrial horizontal line, the system comprising:

at least one upper link defining an angle (ψ) between the at least one upper link and the vehicle horizontal line of the utility vehicle;

at least one lower link defining an angle (φ) between the at least one lower link and the vehicle horizontal line of the utility vehicle;

a support structure formed at the front of the utility vehicle and having the at least one upper link and the at least one lower link pivotably mounted thereto;

an adjustable-length lifting arm having two operative ends including one operative end of the lifting arm comprising an articulated connection to the support structure, and another operative end of the lifting arm comprising an articulated connection to a link-connecting point of the at least one lower link; and an implement articulatably coupled to the support structure, the at least one upper link and the at least one lower link pivotably mounted thereto, and a mass of the implement configured to be determined to precisely transfer the implement into a desired target position by a function of the angle (ψ), the angle (φ), the angle of inclination (θ), a path (AK) representing a connection along the at least one lower link between the support structure and the implement, and a force (FE) impinging on a connection between the at least one upper link and the implement and acting along the at least one upper link, an angle (γ) that is enclosed by a vehicle-vertical line and a connecting path (BD) between the two operative ends of the adjustable-length lifting arm, a force (FZyl) acting between the two operative ends of the lifting arm, and a path (AD) defined by a connection along the at least one lower link between the support structure and the link-connecting point.

* * * * *